(12) United States Patent
Mukouhara et al.

(10) Patent No.: US 8,601,994 B2
(45) Date of Patent: Dec. 10, 2013

(54) PISTON AND METHOD FOR MANUFACTURING THE SAME

(75) Inventors: Hodaka Mukouhara, Wako (JP); Kohji Minami, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 1133 days.

(21) Appl. No.: 12/545,594

(22) Filed: Aug. 21, 2009

(65) Prior Publication Data

US 2010/0065009 A1 Mar. 18, 2010

(30) Foreign Application Priority Data

Sep. 17, 2008 (JP) ................................. 2008-237433

(51) Int. Cl.
*F02F 3/00* (2006.01)
(52) U.S. Cl.
USPC ..................... 123/193.1; 123/193.6
(58) Field of Classification Search
USPC .......................................... 123/193.1, 193.6
See application file for complete search history.

(56) References Cited

U.S. PATENT DOCUMENTS

| | | | | |
|---|---|---|---|---|
| 3,357,318 A | * | 12/1967 | Packard et al. .................. | 92/187 |
| 4,715,267 A | * | 12/1987 | Richmond ....................... | 92/232 |
| 5,713,262 A | * | 2/1998 | Sugiyama et al. .............. | 92/158 |
| 5,839,407 A | * | 11/1998 | Suzuki et al. ............... | 123/193.6 |
| 6,220,215 B1 | * | 4/2001 | Morimoto ................... | 123/193.6 |
| 6,539,910 B1 | * | 4/2003 | Gaiser et al. ................. | 123/193.6 |
| 6,698,391 B1 | * | 3/2004 | Kemnitz ..................... | 123/193.6 |
| 7,406,941 B2 | * | 8/2008 | Zhu et al. .................... | 123/193.6 |
| 8,286,606 B2 | * | 10/2012 | Breidenbach et al. ...... | 123/193.6 |
| 2006/0037471 A1 | * | 2/2006 | Zhu et al. ......................... | 92/173 |

FOREIGN PATENT DOCUMENTS

| | | | | | |
|---|---|---|---|---|---|
| JP | 02078754 A | * | 3/1990 | ................ | F02F 3/00 |
| JP | 3-149340 A | | 6/1991 | | |
| JP | 03267552 A | * | 11/1991 | ................ | F02F 3/00 |
| JP | 7-279754 A | | 10/1995 | | |
| JP | 2000-337212 | * | 12/2000 | ................ | F02F 3/00 |
| JP | 2000-337212 A | | 12/2000 | | |
| JP | 2006-112309 A | | 4/2006 | | |
| JP | 2007-309271 | * | 11/2007 | ................ | F02F 3/00 |
| JP | 2007-309271 A | | 11/2007 | | |

* cited by examiner

*Primary Examiner* — Thanh Truong
*Assistant Examiner* — Tea Holbrook
(74) *Attorney, Agent, or Firm* — Westerman, Hattori, Daniels & Adrian, LLP

(57) ABSTRACT

The present invention reduces weight while assuring required rigidity of a piston reduces cost of the piston. A piston includes first and second pin bosses supporting a piston pins, a first side wall coupling the first pin boss and a piston skirt, a second side wall coupling the second pin boss and the piston skirt, and a pair of bridges coupling the first and second side walls and forming upward spaces just above. First and second through holes are formed in the first and second side walls. The first and second through holes and the upper spaces are formed by a single punching process using a punch and, simultaneously, the bridges are formed.

10 Claims, 9 Drawing Sheets

PISTON AND METHOD FOR MANUFACTURING THE SAME

TECHNICAL FIELD

The present invention relates to a piston reciprocally fit in a cylinder and a method of manufacturing the piston. The piston is used in, for example, an internal combustion engine.

BACKGROUND OF THE INVENTION

A piston for an internal combustion engine is known, having a piston head, a piston skirt, a pair of pin bosses for supporting a piston pin around a pin axis line as a center, and a pair of side walls extending in a direction orthogonal to the pin axis line in plan view and coupling the pin bosses and the piston skirt. In each of the side walls, a through hole penetrating the side wall in the pin axis line direction is formed (refer to, for example, JP-A No. 2000-337212).

Another piston is also known, in which a pair of coupling walls that couple a pair of side walls coupling pin bosses and a piston skirt are formed in positions sandwiching a pin axis line in a direction orthogonal to the pin axis line in plan view in order to enhance rigidity of a piston for an internal combustion engine (refer to, for example, JP-A No. 2007-309271).

SUMMARY OF THE INVENTION

In the case of forming through holes in side walls coupling pin bosses and a piston skirt and also forming through holes in coupling walls coupling the pair of side walls in order to reduce the weight of the piston, in casting, due to complication in the structure of a casting mold and resulting deterioration in yield increase in the cost of the piston is caused. In mechanical processing such as cutting, a process of forming a through hole in a side wall and a process of forming a through hole in a coupling wall are required. Increase in the number of processes causes increase in the cost of the piston.

The present invention realizes lighter weight while assuring required rigidity of a piston and reduces cost of the piston. Cooling of the piston is also improved in the case where the piston is cooled by a coolant. Also, workability of the piston is improved.

A first aspect of the invention relates to a piston including a piston head having a top face; a piston skirt; a first pin boss and a second pin boss supporting a piston pin around a pin axis line as a center; a first side wall extending in a direction orthogonal to the pin axis line in plan view and coupling the first pin boss and the piston skirt; and a second side wall extending in the orthogonal direction and coupling the second pin boss and the piston skirt. A pair of bridges coupling the first side wall and the second side wall and forming spaces directly thereabove are provided in positions sandwiching the pin axis line in the orthogonal direction. First and second through holes penetrating the first and second side walls, respectively, a direction parallel to the pin axis line are formed in the first and second side walls, respectively. The first and second bridges have pin-boss-side ends positioned closer to the pin bosses and piston skirt side ends positioned closer to the piston skirt. The bridges are longer in the pin axis line direction on the piston skirt side end than the pin-boss-side ends.

In a second aspect of the invention, contours of the first through hole, the second through hole, and the upper spaces lie on a cylindrical surface of a virtual prismatic body having generatrices as straight lines parallel with the pin axis line.

In a third aspect of the invention, the through holes have the pin-boss-side ends and skirt-side ends on the piston skirt side. Each of contours of the pin-boss-side ends has a circular arc shape, and contours of the skirt-side ends have linear parts almost parallel in the vertical direction to the piston skirt.

In a fourth aspect of the invention, a pair of reinforcement ribs sandwiching the pin axis line in plan view is formed in each of the pin bosses, and lower ends of the reinforcement ribs extend upward from the pin bosses in the pin axis line direction to an under face of a peripheral part of the piston head.

In a fifth aspect of the invention, each of the bridges has a thickness almost equal to the thickness of the first side wall and the thickness of the second side wall.

A sixth aspect of the invention relates to a method for manufacturing the piston, including a material piston forming step of forming a material piston having a piston head, the piston skirt, a first pin boss and a second pin boss, a first side wall, a second side wall, and a pair of coupling walls coupling the first and second side walls in positions sandwiching the pin axis line in the orthogonal direction in plan view; and a hole forming step of forming the bridges by forming the first and second through holes in the first and second side walls, respectively, and forming the upward spaces in the coupling walls in the process of forming the first and second through holes.

In a seventh aspect of the invention, in the method of manufacturing the piston, in the hole forming step, the first through hole, the second through hole, and the upper spaces are formed by a single punching process.

In the first aspect of the invention, required rigidity of the piston is assured by the bridges as the coupling parts coupling the first and second side walls. On the other hand, the spaces are formed above the bridges, and the first and second through holes are formed in the first and second side walls, respectively. Therefore, the weight of the piston is reduced. In addition, the through holes extend to the pin-boss-side of the bridges, and the upper spaces continue to the first and second through holes in the pin axis line direction. Therefore, the spaces can be formed in the process of forming the first and second through holes. Consequently, formation of the upper spaces and the bridges is facilitated, and the cost of the piston can be reduced. Since the first and second through holes extend to the pin-boss-side of the bridges, the first and second through holes can be enlarged in the orthogonal direction. This contributes to reduction in weight of the piston.

According to the second aspect of the invention, the contours of the first and second through holes and the spaces lie on the cylindrical surface of one virtual prismatic body. Consequently, by hole formation using the virtual plasmatic body as a process tool, the first and second through holes and the spaces can be formed by a single process, and the cost can be reduced.

According to the third aspect of the invention, the contours of the skirt-side ends of the first and second through holes have linear parts. Therefore, while enhancing the rigidity of the piston skirt in the vertical direction, a useless portion in the side walls can be reduced and the weight of the piston can be reduced as compared with the case where the skirt-side end parts have a circular arc shape. Since each of the contours of the pin-boss-side ends has the circular arc shape, although the through holes are in positions close to the pin bosses in the orthogonal direction, deterioration in the rigidity of the pin bosses due to the through holes is prevented.

According to the fourth aspect of the invention, by the pair of reinforcement ribs extending upward from positions lower than the peripheral part of the piston head in the pin bosses and extending in the pin axis line direction, rigidity of the bosses is enhanced. Moreover, in the case of cooling the piston with coolant, the adhesion area of the coolant in the piston can be increased. Therefore, the performance of cooling the piston can be improved.

According to the fifth aspect of the invention, as compared with the case where the thickness of the bridge is larger than the thickness of the first side wall and the thickness of the second side wall, the process for forming the upper spaces and the bridges is facilitated.

According to the sixth aspect of the invention, by forming the upward spaces in the coupling walls formed in the material piston in the process of forming the first and second through holes, the first and second through holes and the upper spaces can be formed by a single process and, further, the bridges can be formed. The cost of the piston can be reduced.

According to the seventh aspect of the invention, the first and second through holes and the upper spaces can be formed by a single punching process, so that the cost can be reduced.

BRIEF DESCRIPTION OF THE DRAWINGS

The advantages of the present invention will become apparent in the following description taken in conjunction with the drawings, wherein.

DETAILED DESCRIPTION OF THE INVENTION

Figure 1:
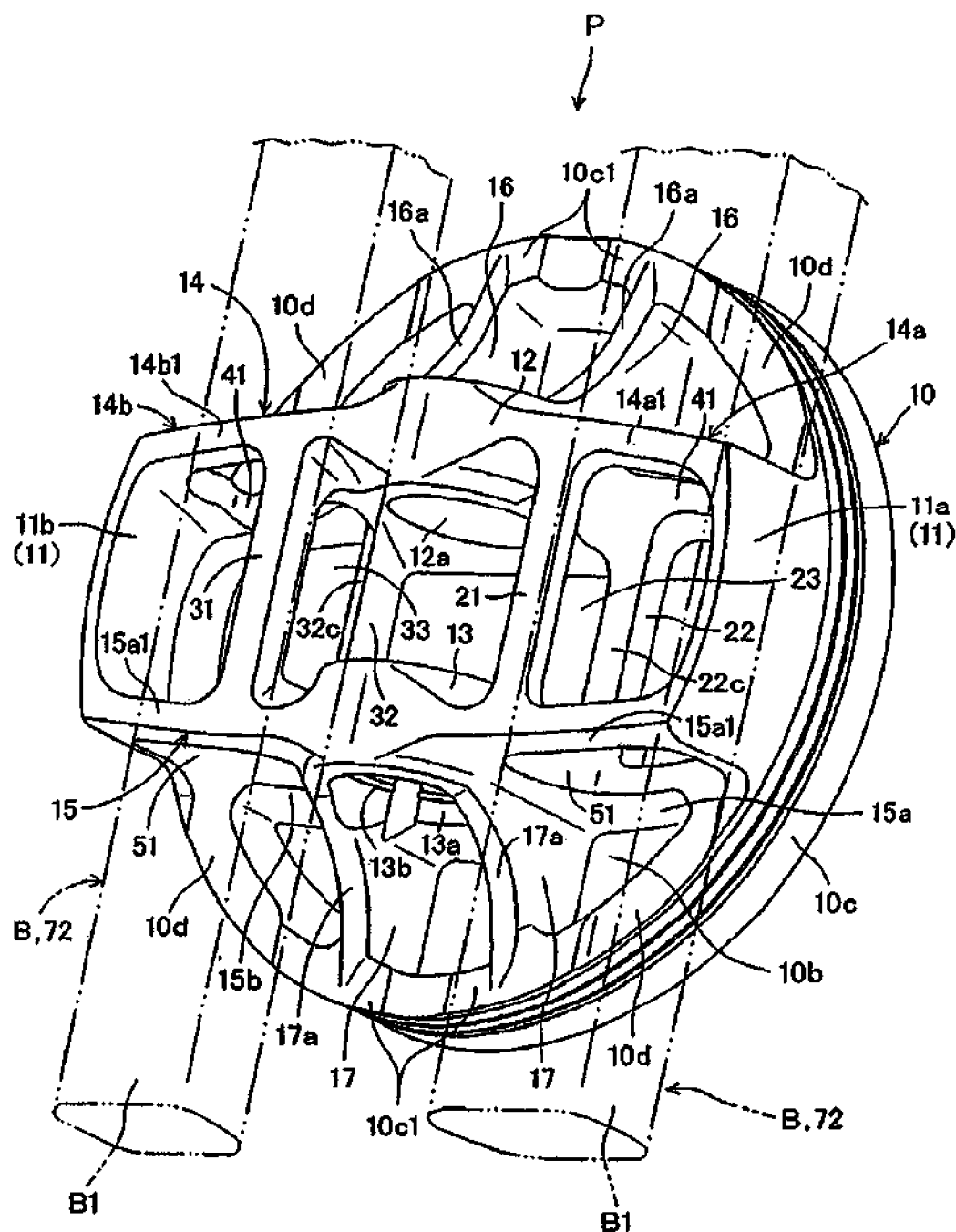
FIG. 1 is a perspective view of a piston to which the present invention is applied, viewed from obliquely downward.

An embodiment of the present invention will be described below with reference to FIGS. 1 to 9.

Referring to FIGS. 1 to 4, a piston P to which the present invention is applied is a piston for an internal combustion engine and is reciprocally fit in a cylinder 1 (refer to FIG. 4) of a four-stroke internal combustion engine. A cylinder head 2 forming the body of the internal combustion engine in cooperation with the cylinder 1 is provided with a combustion chamber 3 so as to face the piston P in a piston axis direction A1 parallel with a piston axis line L1 of the piston P. The piston P which reciprocates by being driven by pressure of a combustion gas generated by combustion of air-fuel mixture in the combustion chamber 3 is coupled to the crankshaft of the internal combustion engine via a con rod 5 (also refer to FIG. 5) coupled to the piston P via a piston pin 4 (also refer to FIG. 5), and rotates the crankshaft.

The piston P includes: a piston head 10 having a top face 10a that receives combustion pressure; a piston skirt 11 extending downward in the piston axis direction A1 from the columnar-shape piston head 10 having a piston axis L1 as the center line; first and second pin bosses 12 and 13 supporting the piston pin 4 inserted in a small end 5a of the con rod 5 and coupled to the con rod 5 using a pin axis line L2 as a center; a first side wall 14 extending in a direction A3 orthogonal to the pin axis line L2 in plan view and coupling the first pin boss 12 and the piston skirt 11; a second side wall 15 extending in the orthogonal direction A3 and coupling the second pin boss 13 and the piston skirt 11; a pair of first and second coupling parts 20 and 30 provided in positions sandwiching the first and second pin bosses 12 and 13 or the pin axis line L2 in the orthogonal direction A3 in plan view and coupling the pair of side walls 14 and 15; and reinforcement ribs 16 and 17 coupling the pin bosses 12 and 13 and an outer peripheral part 10c of the piston head 10.

The piston P is made of an aluminum alloy as a light metal and formed by forging.

In the specification and the scope of claims, the vertical direction is the piston axis direction A1. The upward direction is a direction in which the top face 10a is positioned above the pin axis direction L2 in the vertical direction. Plan view denotes view from the vertical direction (or the piston axis direction A1). In the embodiment, the circumferential direction and the radial direction are set using the piston axis line L1 as a center.

In the piston head 10, a first ring groove 10h and a second ring groove 10k in which a compression ring 6 and an oil ring 7 are to be attached, respectively, are formed in the peripheral surface of an annular peripheral part 10c. The top surfaces of the pin bosses 12 and 13, the side walls 14 and 15, and the reinforcement ribs 16 and 17 continue to a rear face 10b of the piston head 10.

The piston skirt 11 slidably in contact with the inner wall surface of the cylinder 1 is made by first and second skirt parts 11a and 11b formed with an interval in the circumferential direction. Each of the first and second skirt parts 11a and 11b facing each other in the orthogonal direction A3 extends downward from the peripheral part 10c in a predetermined range in the circumferential direction.

The first side wall 14 coupling the first ends in the circumferential direction of the pair of skirt parts 11a and 11b via the first pin boss 12 has a first wall part 14a coupling the first pin boss 12 and the first skirt part 11a in the orthogonal direction A3, and a second wall part 14b coupling the first pin boss 12 and the second skirt part 11b in the orthogonal direction A3.

Similarly, the second side wall 15 coupling the other ends in the circumferential direction of the pair of skirt parts 11a and 11b via the second pin boss 13 has a first wall part 15a coupling the second pin boss 13 and the first skirt part 11a in the orthogonal direction A3, and a second wall part 15b coupling the second pin boss 13 and the second skirt part 11b in the orthogonal direction A3.

In the pin bosses 12 and 13, columnar-shaped pin holes 12a and 13a are provided, respectively, as insertion parts in which the piston pin 4 is inserted and rotatably fit. In circumferential wall faces of the pin holes 12a and 13a, grooves 12b and 13b (also refer to FIG. 5) in which retaining clips for the piston pin 4 are attached are provided.

A pin axis line L2 is an oscillation center line of the con rod 5 coupled to the piston pin 4. In the embodiment, the pin axis line L2 is the center line of the pin holes 12a and 13a and also the center line of the piston pin 4 supported by the pin bosses 12 and 13.

Figure 5:
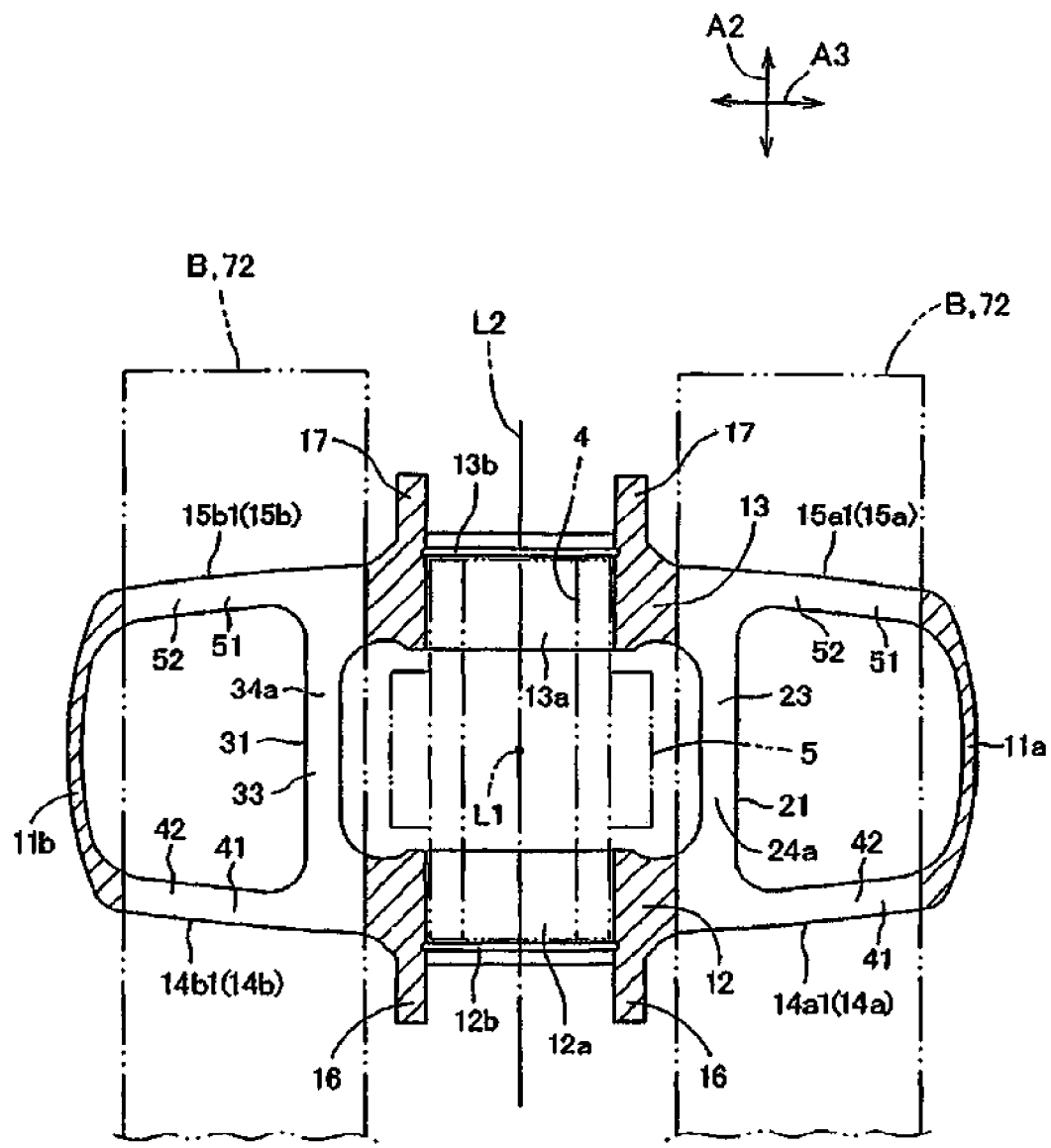
FIG. 5 is a cross section taken along line V-V of FIG. 3.

Also referring to FIG. 5, the first coupling part 20 is constructed by a first bridge 21 as a first lower coupling part that couples lower parts of the first wall parts 14a and 15a or lower ends 14a1 and 15a1, and first projected walls 22 as first upper coupling parts that couple upper parts of the first wall parts 14a and 15a.

Similarly, the second coupling part 30 is constructed by a second bridge 31 as a second lower coupling part that couples lower parts of the second wall parts 14b and 15b or lower ends 14b1 and 15b1, and a second projected wall 32 as a second upper coupling part that couples upper parts of the second wall parts 14b and 15b.

The bridges 21 and 31 and the projected walls 22 and 32 are disposed between the pin bosses 12 and 13 and the first skirt part 11a or the second skirt part 11b near to the pin bosses 12 and 13, extend in parallel with the pin axis line direction A2 which is parallel with the pin axis line L2, and are in positions sandwiching the pin bosses 12 and 13, the piston pin 4, and the pin axis line L2 in the orthogonal direction A3 in plan view.

Since the projected walls 22 and 32 project downward from the rear face 10b of the piston head 10, their upper parts are continued to the rear face 10b. In the vertical direction, between the first bridge 21 and the first projected wall 22 and between the second bridge 31 and the second projected wall 32, at least a part of upper spaces 23 and 33, in the embodiment, almost all of the upper spaces 23 and 33 are formed just above the bridges 21 and 31 and just below the projected walls 22 and 32, respectively, in the vertical direction. Therefore, in the embodiment, the upper spaces 23 and 33 are spaces at least part of which (in the embodiment, almost all of the spaces) exist in projections of the bridges 21 and 31 or the projected walls 22 and 32 in a direction parallel with the vertical direction, and are through holes penetrating the coupling parts 20 and 30 in the orthogonal direction A3.

The bridges 21 and 31 are parts effective to enhance rigidity for suppressing bending deformation such that the pin bosses 12 and 13 spread like an unfolded fan shape in the pin axis line direction A2 when viewed from the orthogonal direction A3 by a load acting on the piston P by coupling the lower ends 14a1 and 15a1 of the first wall parts 14a and 15a, lower ends 14b1 and 15b1 of the second wall parts 14b and 15b, or parts near the lower ends. On the other hand, the projected walls 22 and 32 function as reinforcement ribs that suppress bending deformation in the piston head 10. Therefore, by forming the upper spaces 23 and 33 between the bridges 21 and 31 and the projected walls 22 and 32 in the vertical direction, while assuring required rigidity of the piston P, the weight of the piston P can be reduced.

Each of the bridges 21 and 31 has a thickness t3 in the orthogonal direction A3 almost equal to each of thicknesses t1 and t2 which are almost equal to each other in the pin axis line direction A2, of the first wall parts 14a and 15a, respectively, and thicknesses t1 and t2 which are almost equal to each other in the pin axis line direction A2, of the second wall parts 14b and 15b in a center portion having a width almost equal to interval W (refer to FIG. 2) between the pin bosses 12 and 13 in the pin axis line direction A2. In another example, the projected walls 22 and 32 may have an almost uniform thickness t3 over almost entire width in the pin axis line direction A2.

In the first wall parts 14a and 15a in the side walls 14 and 15, the first through hole 41 and the second through hole 51 penetrating the first wall parts 14a and 15a, respectively, in the pin axis line direction A2 are formed, respectively. Similarly, in the second wall parts 14b and 15b, the first through hole 41 and the second through hole 51 penetrating the second wall parts 14b and 15b, respectively, in the pin axis line direction A2 are formed, respectively.

The first through hole 41 and the second through hole 51 have the same shape when viewed from the pin axis line direction A2, and are plane-symmetrical with respect to a plane including the piston axis line L1 and orthogonal to the pin axis line direction A2. The pair of first through holes 41 and the pair of second through holes 51 are plane-symmetrical with respect to a plane including the piston axis line L1 and orthogonal to the orthogonal direction A3.

Figure 3:
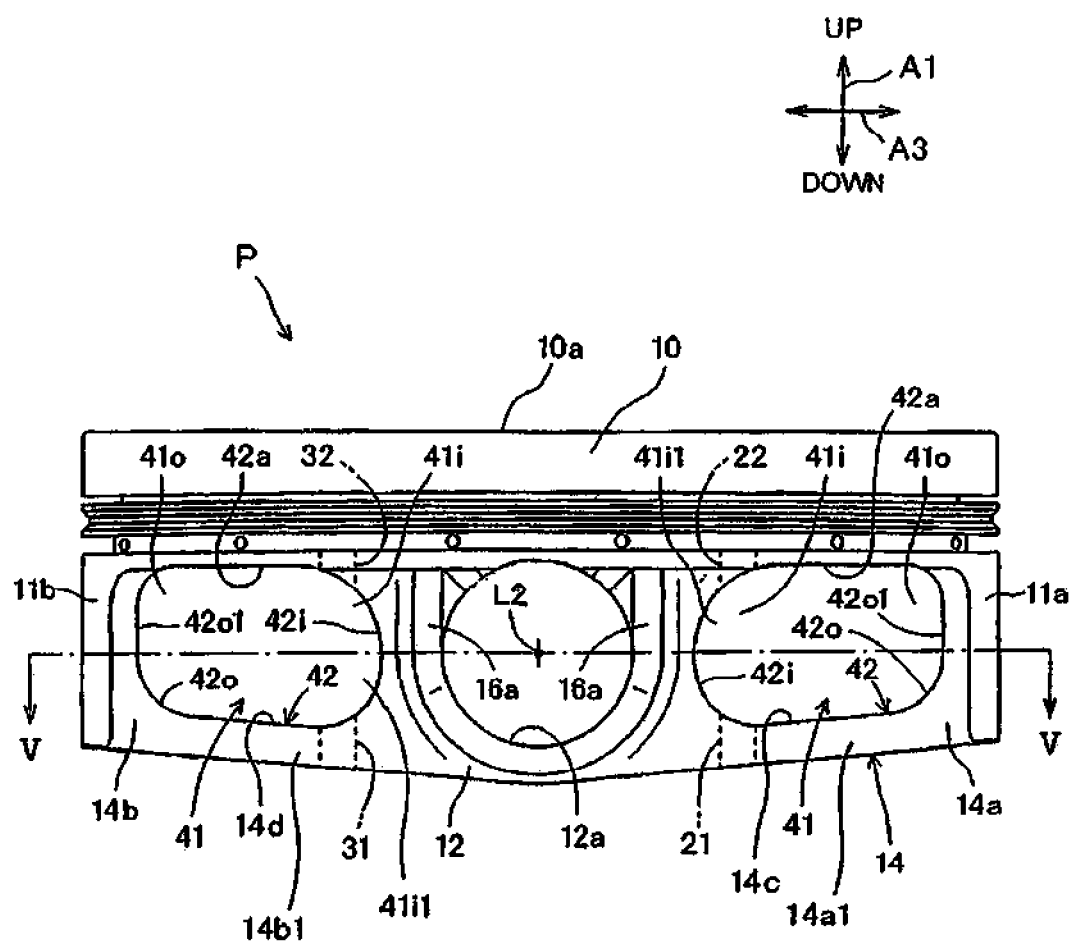
FIG. 3 is a cross section taken along line III-III of FIG. 1.
Figure 4:
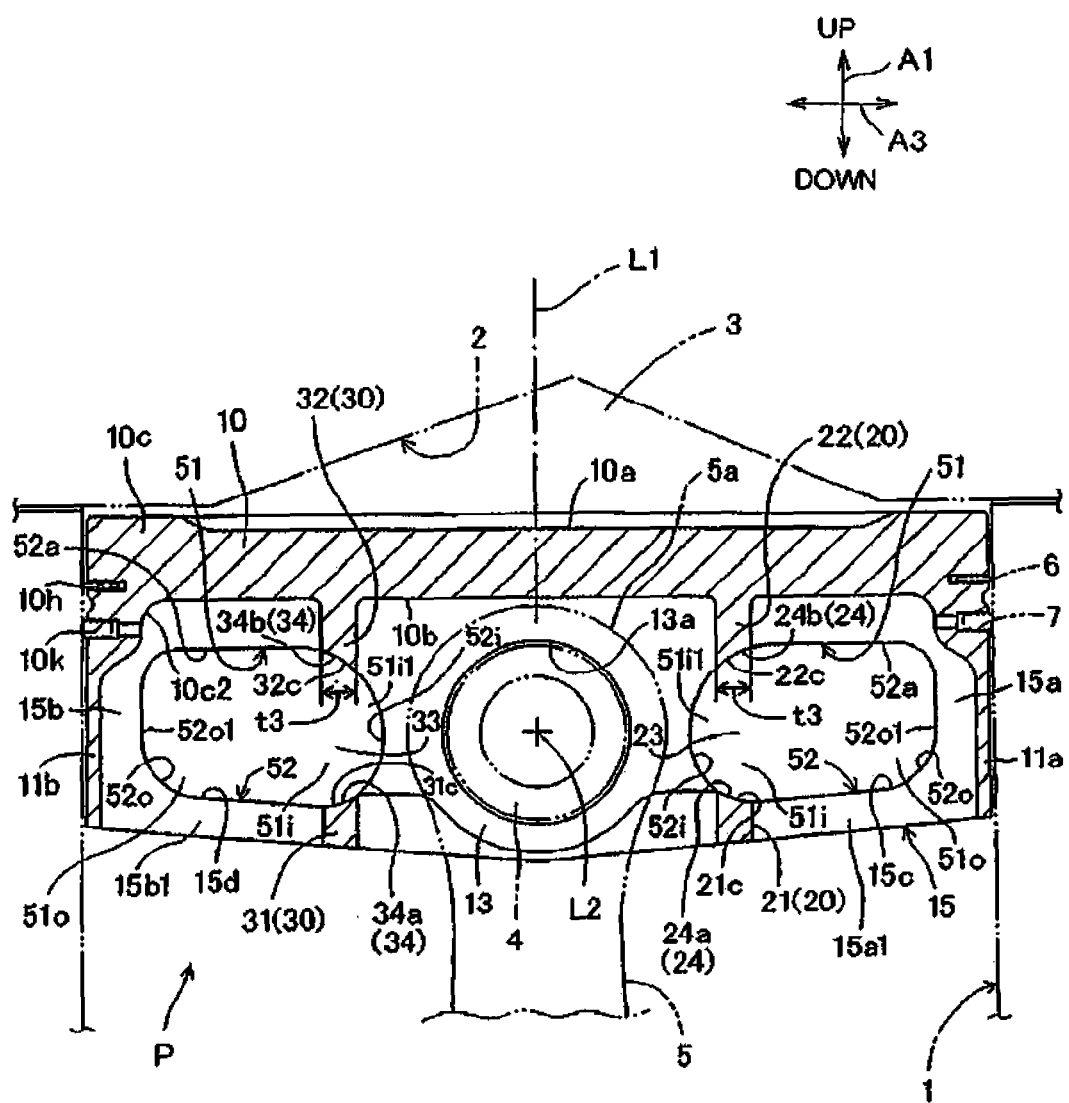
FIG. 4 is a cross section taken along line IV-IV of FIG. 2.

Referring to FIGS. 3 and 4, the first and second through holes 41 and 51 have contours 42 and 52, respectively, which are the same when viewed from the pin axis line direction A2. Therefore, the contours 42 and 52 generally overlap each other when viewed from the pin axis line direction A2. The first and second through holes 41 and 51 have, when viewed from the pin axis line direction A2, pin-boss-side ends 41i and 51i as inner ends closer to the pin bosses 12 and 13 in the orthogonal direction A3 and skirt-side ends 41o and 51o as outer ends closer to the skirt parts 11a and 11b, respectively.

The positions in the orthogonal direction A3 of the pin-boss-side ends 41i and 51i in the through holes 41 and 51 are closer to the pin bosses 12 and 13 than the bridges 21 and 31 and the projected walls 22 and 32 in the orthogonal direction A3, and have projected parts 41i1 and 51i1 projected toward the pin bosses 12 and 13 relative to the bridges 21 and 31 and the projected walls 22 and 32 in the orthogonal direction A3. Therefore, the pin-boss-side ends 41i and 51i are positioned closer to the first and second pin bosses 12 and 13 than the bridges 21 and 31 and the projected walls 22 and 32 in the orthogonal direction A3. Each of contours 42i and 52i of the pin-boss-side ends 41i and 51i has a circular arc shape.

Since the shape of each of the contours 42i and 52i of the pin-boss-side ends 41i and 51i is a circular arc shape, the projection height as a projection amount in the vertical direction relative to the bridges 21 and 31 and the projected walls 22 and 32 increases toward the pin bosses 12 and 13 in the orthogonal direction A3. Consequently, rigidity of the portion around the pin bosses 12 and 13 is enhanced.

The skirt-side ends 41o and 51o have contours 42o and 52o having linear parts 42o1 and 52o1 almost parallel with each other in the vertical direction in a position where the positions in the orthogonal direction in the through holes 41 and 51 is almost the same as an inner peripheral face 10c2 of the peripheral part 10c on a plane including the piston axis line L1 and orthogonal to the pin axis line L2. The linear parts 42o1 and 52o1 are in positions which overlap more than half of the skirt parts 11a and 11b in the vertical direction.

The bridges 21 and 31 are longer in the pin axis line direction A2 at positions on the side of the skirt parts 11a and 11b than they are in the pin-boss-side ends 41i and 51i (refer to FIG. 5).

The contour 42 of the first through hole 41 is specified by peripheral wall faces 14c and 14d of the first and second wall parts 14a and 14b of the first side wall 14. The contour 52 of the second through hole 51 is specified by peripheral wall faces 15c and 15d of the first and second wall parts 15a and 15b of the second side wall 15. Contours 24 and 34 of the upper spaces 23 and 33 are constructed by lower contours 24a and 34a (also refer to FIG. 5) specified by upper wall faces 21c and 31c of the bridges 21 and 31 and lower contours 24b and 34b specified by lower wall faces 22c and 32c (also refer to FIG. 1) of the projected walls 22 and 32. The contours 42, 52, 24, and 34 lie on a cylindrical surface B1 of a virtual prismatic body B (refer to FIGS. 1 and 5) having generatrices as straight lines parallel with the pin axis line L2. The virtual prismatic body B has, as a sectional shape in a plane orthogonal to the pin axis line L2, the shape of the first through hole 41 or the second through hole 51 when viewed from the pin axis line direction A2. The uppermost parts 42a and 52a of the contours 42 and 52 of the through holes 41 and 51 are in positions almost the same as an under face 10c1 of the peripheral part 10c in the vertical direction.

Figure 2:
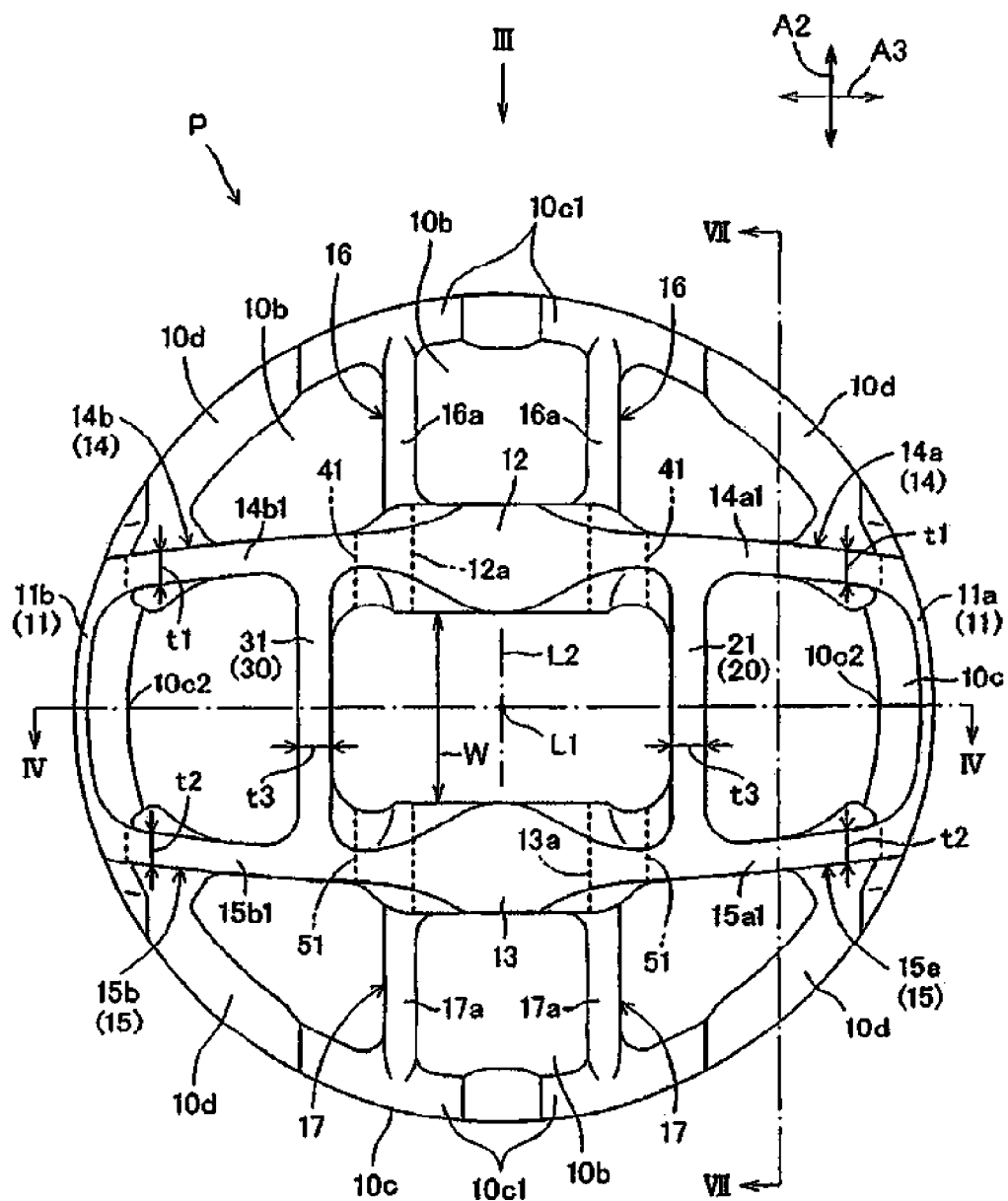
FIG. 2 is a bottom view of the piston of FIG. 1.

Referring to FIGS. 1 to 3, in the first pin boss 12, a pair of reinforcement ribs 16 facing each other in the orthogonal direction A3 at an interval almost equal to the diameter of the pin hole 12a sandwiching the pin axis line L2 in the orthogonal direction A3 in plan view is formed in parallel with the pin axis line direction A2. In the second pin boss 13, a pair of reinforcement ribs 17 facing each other in the orthogonal direction A3 at an interval almost equal to the diameter of the pin hole 13a sandwiching the pin axis line L2 in the orthogonal direction A3 in plan view is formed in parallel with the pin axis line direction A2.

The upper parts of the reinforcement ribs 16 and 17 are continued to the rear face 10b of the piston head 10, and the reinforcement ribs 16 and 17 extend in the pin axis line direction A2. Lower ends 16a and 17a of the reinforcement ribs 16 and 17 extend from the lower half part of the pin bosses 12 and 13 toward the under face 10c1 of the peripheral part 10c in the vertical direction and extend upward and smoothly tilted in the pin axis line direction (refer to FIG. 1). The outermost parts in the radial direction of the lower ends 16a and 17a are continued to the under face 10c1 of the peripheral part 10c. Consequently, the pair of reinforcement ribs 16 are in positions sandwiching the pin hole 12a in the orthogonal direction A3 below the peripheral part 10c. Similarly, the pair of reinforcement ribs 17 are in positions sandwiching the pin hole 13a in the orthogonal direction A3 below the peripheral part 10c.

To the piston P, an oil as a coolant injected from an oil jet as a coolant supply unit provided for the cylinder 1, the con rod 5 (refer to FIG. 4), or the like. The injected oil hits the rear face 10b, the pin bosses 12 and 13, the projected walls 22 and 32, the reinforcement ribs 16 and 17, and the like and is adhered, thereby cooling the piston P. The oil is supplied to a sliding part between the pin bosses 12 and 13 and the piston pin 4 and a sliding part between the small end 5a and the piston pin 4 to lubricate the sliding parts.

With reference to FIG. 1 and FIGS. 6 to 9, a method of manufacturing the piston P will be described.

Figure 6:
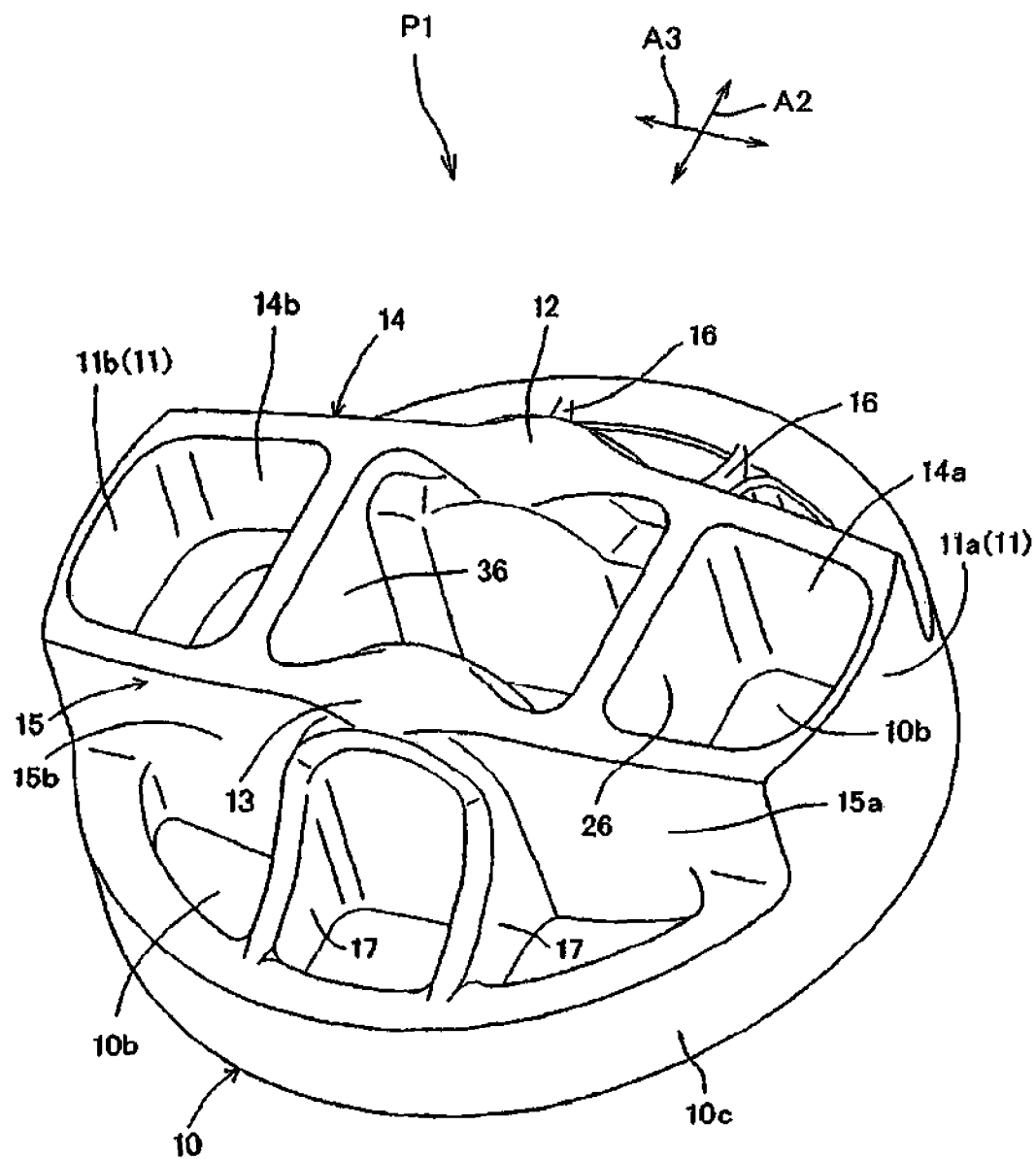
FIG. 6 is a perspective view of a material piston formed in a process of forming the piston of FIG. 1, viewed from obliquely downward.

Referring to FIG. 6, in a material piston forming process, a primary material piston P1 shown in FIG. 6 is formed by forging using a dice. The primary material piston P1 includes the piston head 10, the piston skirt 11 constructed by the pair of skirt parts 11a and 11b, the first and second pin bosses 12 and 13, the first and second side walls 14 and 15, the pair of coupling walls 26 and 36 coupling the first and second side walls 14 and 15 in positions sandwiching the first and second pin bosses 12 and 13 in the orthogonal direction A3, and the reinforcement ribs 16 and 17.

The upper parts of the coupling walls 26 and 36 are continued to the rear face 10b of the piston head 10. In the primary material piston P1, the grooves 10h and 10k (refer to FIG. 5) are not formed in the piston head 10. In the pin bosses 12 and 13, the pin holes 12a and 13a (refer to FIG. 1) and the grooves 12b and 13b (refer to FIG. 1) are not formed. In the first and second side walls 14 and 15, the first through hole 41 (refer to FIG. 3) is not formed in the first and second wall parts 14a and 14b. In the first and second wall parts 15a and 15b of the second side wall 15, the second through hole 51 (refer to FIG. 4) is not formed.

After the piston material forming process, the first and second through holes 41 and 51 are formed in the first and second side walls 14 and 15, respectively. In the process of forming the first and second through holes 41 and 51, the upper spaces 23 and 33 are formed in the coupling walls 26 and 36. In such a manner, a hole forming process of forming the bridges 21 and 31 (refer to FIG. 1) and the projected walls 22 and 32 (refer to FIG. 1) is performed.

Figure 7:
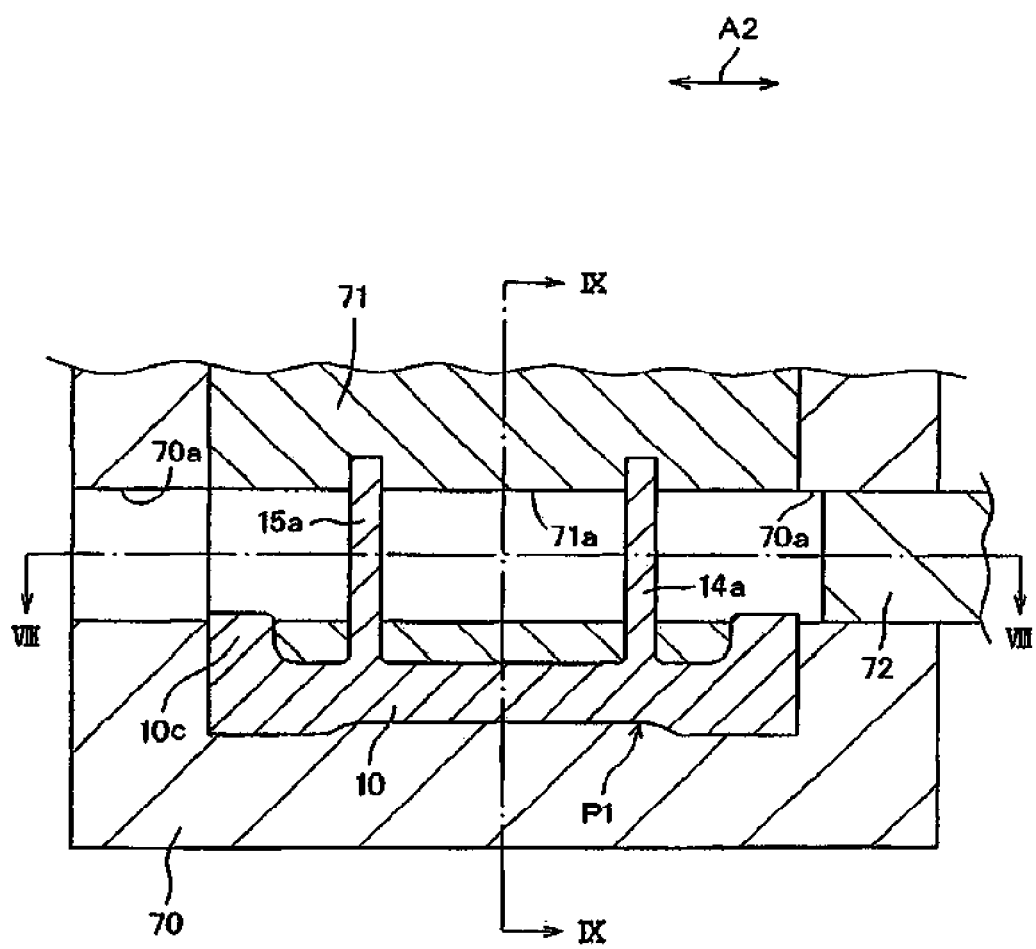
FIG. 7 is a cross section of a main part corresponding to a section taken along line VII-VII of FIG. 2, in a state where the material piston of FIG. 6 is housed in a hole formation dice in a hole forming process.
Figure 8:
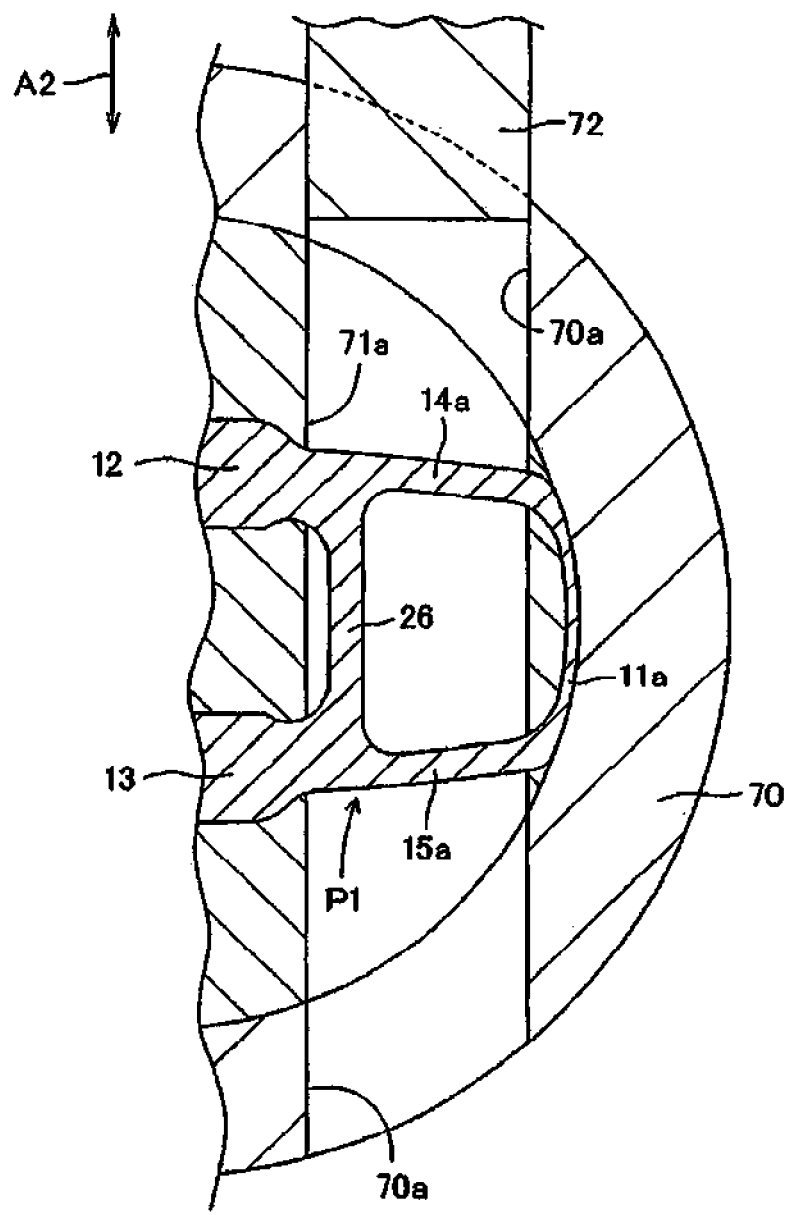
FIG. 8 is a cross section of a main part taken along line VIII-VIII of FIG. 7.
Figure 9:
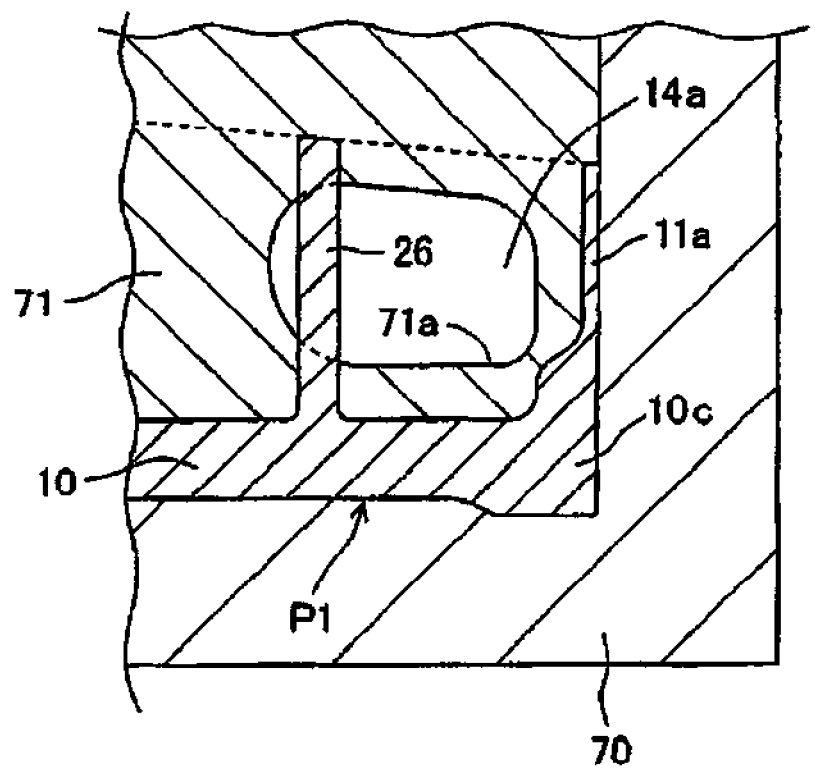
FIG. 9 is a cross section of a main part taken along line IX-IX of FIG. 7.

Referring also to FIGS. 7 to 9, in the hole forming process, in a state where the primary material piston P1 is disposed in a space formed by a lower dice 70 and an upper dice 71, a punching process as plastic forming process serving as the hole forming process is performed. In the lower dice 70 and the upper dice 71, guide holes 70a and 71a in which punches 72 (shown by alternate long and two short dashes lines in FIGS. 1 and 5) as hole forming tools each having the same shape as that of the virtual prismatic body B are inserted and guided in parallel with the pin axis line direction A2. The lower dice 70, the upper dice 71, and the punch 72 construct the hole forming dice.

When the punch 72 in a position before start of the process shown in FIG. 7 is driven in the pin axis line direction A2 and is moved to the left direction as a direction parallel with the pin axis line direction A2 in FIG. 7, first, a part of the peripheral part 10c is cut and removed, thereby forming a recess 10d (refer to FIG. 1). Further, a part of the first and second wall parts 14a and 14b of the first side wall 14, the coupling walls 26 and 36, and the first and second wall parts 15a and 15b of the second side wall 15 is punched and removed.

As described above, the first and second through holes 41 and 51 and the upper spaces 23 and 33 shown in FIG. 1 are formed by a single process using the punch 72, and the bridges 21 and 31 and the projected walls 22 and 32 as the remaining parts of the coupling walls 26 and 36 are formed. In such a manner, a secondary material piston having the bridges 21 and 31 and the projected walls 22 and 32 is formed.

After that, the secondary material piston is subjected to mechanical process for forming the pin holes 12a and 13a, the grooves 6, 7, 12b, and 13b, and the like and, further, finishing process. The piston P shown in FIG. 1 is completed.

The action and effect of the embodiment constructed as described above will now be explained.

The piston P has, in positions sandwiching the pin axis line L2 in the orthogonal direction A3, the pair of bridges 21 and 31 coupling the first and second side walls 14 and 15 and forming the upper spaces 23 and 33 just above. In the first and second side walls 14 and 15, the first and second through holes 41 and 51 penetrating the first and second side walls 14 and 15 in the pin axis line direction A2 are formed. The first and second through holes 41 and 51 have the pin-boss-side ends 41i and 51i, respectively, positioned closer to the pin bosses 12 and 13 than the bridges 21 and 31 in the orthogonal direction A3. At positions closer to the piston skirt 11 than the pin-boss-side ends 41i and 51i in the orthogonal direction A3, the bridges are longer in the pin axis line direction A2. With the structure, by the bridges 21 and 31 as the coupling parts 20 and 30 coupling the first and second side walls 14 and 15, required rigidity of the piston P is assured. On the other hand, the upper spaces 23 and 33 are formed just above the bridges 21 and 31. Further, the first and second through holes 41 and 51 are formed in the first and second side walls 14 and 15, respectively. Therefore, the weight of the piston P is reduced. The projected parts 41i1 and 51i1 of the pin-boss-side ends 41i and 51i of the first and second through holes 41 and 51 are positioned closer to the pin bosses 12 and 13 than the bridges 21 and 31, and the upper spaces 23 and 33 continue to the first and second through holes 41 and 51 in the pin axial line direction A2. Consequently, in the process of forming the first and second through holes 41 and 51, the upper spaces 23 and 33 can be formed. This facilitates formation of the upper spaces 23 and 33 and the bridges 21 and 31, and the cost of the piston P can be reduced. Since the pin-boss-side ends 41i and 51i are positioned closer to the side of the pin bosses 12 and 13 than the bridges 21 and 31, the first and second through holes 41 and 51 can be enlarged in the orthogonal direction A3. This contributes reduction in the weight of the piston P.

The contours 42, 52, 24, and 34 of the first through hole 41, the second through hole 51, the upper space 23, and the upper space 33, respectively lie on the cylindrical surface B1 of the virtual prismatic body B having generatrices as straight lines parallel with the pin axis line L2. Since the contours 42, 52, 24, and 34 of the first through hole 41, the second through hole 51, the upper space 23, and the upper space 33, respectively lie on the cylindrical surface B1 of the virtual prismatic body B, by hole formation using the virtual prismatic body B as a processing tool, the first and second through holes 41 and 51 and the upper spaces 23 and 33 can be formed by a single process, and the cost can be reduced.

In the through holes 41 and 51, each of the contours 42$i$ and 52$i$ of the pin-boss-side ends 41$i$ and 51$i$ has a circular arc shape, and the contours 42$o$ and 52$o$ of the skirt-side ends 41$o$ and 51$o$ on the side of the piston skirt 11 in the orthogonal direction A3 have the linear parts 42$o$1 and 52$o$1 almost parallel with each other in the vertical direction. Therefore, while enhancing rigidity of the piston skirt 11 in the vertical direction, a useless portion in the side walls 14 and 15 can be reduced and the weight of the piston P can be reduced as compared with the case where the skirt-side end parts 41$o$ and 51$o$ have a circular shape. Since each of the contours 42$i$ and 52$i$ of the pin-boss-side ends 41$i$ and 51$i$ has the circular arc shape, although the through holes 41 and 51 are in positions close to the pin bosses 12 and 13 in the orthogonal direction A3, deterioration in the rigidity of the pin bosses 12 and 13 due to the through holes 41 and 51 is prevented.

In the pin bosses 12 and 13, the pair of reinforcement ribs 16 and 17 facing each other in the orthogonal direction A3 and sandwiching the pin axis line L2 is formed. The lower ends 16$a$ and 17$a$ of the reinforcement ribs 16 and 17 extend upward and in the pin axis line direction A2 and are continued to the under face 10$c$1 of the peripheral part 10$c$ of the piston head 10. Consequently, by the reinforcement ribs 16 and 17 extending upward from positions below the peripheral part 10$c$ of the piston head 10 in the pin bosses 12 and 13 and extending in the pin axis line direction A2, the rigidity of the pin bosses 12 and 13 is enhanced. Moreover, in the case of cooling the piston P with an oil, the oil adhesion area in the piston P can be increased by the amount of the reinforcement ribs 16 and 17, so that the performance of cooling the piston P can be improved. Particularly, by injecting the oil from the oil jet so as to be directed obliquely upward toward the reinforcement ribs 16 and 17 and directed along the side faces in the orthogonal direction A3 of the reinforcement ribs 16 and 17, the adhesion amount of the oil to the reinforcement ribs 16 and 17 is increased, and the cooling performance can be further improved.

Each of the bridges 21 and 31 has the thickness t3 almost equal to the thickness t1 of the first side wall 14 and the thickness t2 of the second side wall 15. As compared with the case where the thickness t3 of each of the bridges 21 and 31 is larger than the thicknesses t1 and t2 of the first and second side walls 14 and 15, the process for forming the upper spaces 23 and 33 and the bridges 21 and 31 is facilitated.

In the material piston forming process, the primary material piston P1 having the pair of coupling walls 26 and 36 coupling the first and second side walls 14 and 15 is formed by forging. In the hole forming process, the first and second through holes 41 and 51 are formed in the first and second side walls 14 and 15, respectively. In the process of forming the first and second through holes 41 and 51, the upper spaces 23 and 33 and the bridges 21 and 31 are formed in the coupling walls 26 and 36. In such a manner, in the process of forming the first and second through holes 41 and 51, the upper spaces 23 and 33 can be formed in the coupling walls 26 and 36 of the primary material piston P1. As a result, the first and second through holes 41 and 51 and the upper spaces 23 and 33 can be formed by a single process, so that the cost of the piston P can be reduced.

In the hole forming process, the first and second through holes 41 and 51 and the upper spaces 23 and 33 are formed by a single process such as a punching process, so that the first and second through holes 41 and 51 and the upper spaces 23 and 33 can be formed by a single punching process. Therefore, the cost is reduced. Further, in the punching process, the recess 10$d$ is formed in the under face 10$c$1 of the peripheral part 10$c$ of the piston head 10. By formation of the recess 10$d$, the weight of the piston P is reduced.

Changed configurations of embodiments obtained by changing a part of the foregoing embodiment will be described below.

The material piston P1 may be formed by casting.

The first and second through holes 41 and 51 and the upper spaces 23 and 33 may be formed by a single process of mechanical process such as cutting.

Although the upper parts of the coupling walls 26 and 36 of the material piston P1 are continued to the rear face 10$b$ of the piston head 10, an interval may be formed in the vertical direction between the coupling walls 26 and 36 and the rear face 10$b$. In this case, the projected walls 22 and 32 are not formed.

In the case where at least one secondary bridge as a secondary coupling part is formed as a part of the coupling parts 20 and 30 coupling the side walls 14 and 15 is formed just above the bridges 21 and 31 and, further, a plurality of secondary bridges are provided between the bridges and the secondary bridge, the upper spaces 23 and 33 may be formed between the secondary bridges. In the case where there are projected walls 22 and 32, the upper spaces 23 and 33 may be formed between the secondary bridges and the projected walls 22 and 32. In this case, a plurality of upper spaces 23 and 33 are formed above the single bridge 21 and 31.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A piston, comprising:
   a piston head having a top face;
   a piston skirt;
   a first pin boss and a second pin boss for supporting a piston pin around a pin axis line as a center;
   a first side wall extending in a direction orthogonal to the pin axis line in plan view and coupling said first pin boss and said piston skirt; and
   a second side wall extending in the orthogonal direction and coupling said second pin boss and said piston skirt,
   a pair of bridges coupling said first and second side walls and defining through spaces within said bridges, said pair of bridges sandwiching the pin axis line in a direction orthogonal to the pin axis line;
   wherein first and second through holes are formed to penetrate said first and second side walls, respectively, in a direction parallel to the pin axis line;

wherein said bridges have pin-boss-side ends positioned closest to said pin bosses, in the direction orthogonal to the pin axis line, and piston-skirt-side ends positioned closest to said piston skirt, in the direction orthogonal to the pin axis line;

wherein said piston-skirt-side ends of said bridges are longer in the direction of the pin axis line than said pin-boss-side ends of said bridges; and wherein contours of said first through hole, said second through hole, and said through spaces lie on a surface of a virtual prismatic body having generatrices as straight lines parallel with the pin axis line.

2. The piston according to claim 1, wherein said through holes have said pin-boss-side ends closest to said pin bosses, in the direction orthogonal to the pin axis line, and piston-skirt-side ends closest to said piston skirt, in the orthogonal direction to the pin axis line;

wherein said pin-boss-side ends of said through holes have a circular arc shape; and wherein said piston-skirt-side ends of said through holes have linear parts substantially parallel to said piston skirt in the vertical direction.

3. The piston according to claim 2, wherein each of said pin bosses includes a pair of reinforcement ribs sandwiching the pin axis line in plan view and extending in a direction parallel to the pin axis line; and wherein lower ends of said pair of reinforcement ribs extend upward from said pin bosses to an under face of a peripheral part of said piston head in the pin axis direction.

4. The piston according to claim 3, wherein each of said bridges has a thickness which is different than a thickness of said first side wall and a thickness of said second side wall.

5. The piston according to claim 2, wherein each of said bridges has a thickness which is different than a thickness of said first side wall and a thickness of said second side wall.

6. The piston according to claim 1, wherein each of said pin bosses includes a pair of reinforcement ribs sandwiching the pin axis line in plan view and extending in a direction parallel to the pin axis line; and wherein lower ends of said pair of reinforcement ribs extend upward from said pin bosses to an under face of a peripheral part of said piston head in the pin axis direction.

7. The piston according to claim 6, wherein each of said bridges has a thickness which is different than a thickness of said first side wall and a thickness of said second side wall.

8. The piston according to claim 1, wherein each of said bridges has a thickness which is different than a thickness of said first side wall and a thickness of said second side wall.

9. A method for manufacturing a piston, the method comprising:

forming a material piston having a piston head, a piston skirt, a first pin boss, a second pin boss, a first side wall, a second side wall, and a pair of coupling walls coupling said first and second side walls, said pair of coupling walls being disposed in positions sandwiching a pin axis line in a direction orthogonal to said pin axis line in plan view; and forming bridges by forming first and second through holes in said first and second side walls, respectively, and thereby forming through spaces in said coupling walls, wherein said first and second through holes are formed to penetrate said first and second side walls, respectively, in a direction parallel to the pin axis line;

wherein said bridges have pin-boss-side ends positioned closest to said pin bosses, in the direction orthogonal to the pin axis line, and piston-skirt-side ends positioned closest to said piston skirt, in the direction orthogonal to the pin axis line;

wherein said piston-skirt-side ends of said bridges are longer in the direction of the pin axis line than said pin-boss-side ends of said bridges; and wherein contours of said first through hole, said second through hole, and said through spaces lie on a surface of a virtual prismatic body having generatrices as straight lines parallel with the pin axis line.

10. The method of claim 9, wherein in said first through hole, said second through hole, and said through spaces are formed by a single punching process.

* * * * *